(12) United States Patent
King, Jr. et al.

(10) Patent No.: US 7,685,795 B2
(45) Date of Patent: Mar. 30, 2010

(54) GRIP BELT DRIVE SYSTEM

(75) Inventors: Francis X. King, Jr., Brookline, NH (US); Mitchell W. Smith, Newton, NH (US)

(73) Assignee: Shanklin Corporation, Ayer, MA (US)

( * ) Notice: Subject to any disclaimer, the term of this patent is extended or adjusted under 35 U.S.C. 154(b) by 680 days.

(21) Appl. No.: 11/169,466

(22) Filed: Jun. 29, 2005

(65) Prior Publication Data
US 2007/0000213 A1  Jan. 4, 2007

(51) Int. Cl.
*B65B 9/06* (2006.01)
(52) U.S. Cl. .......................... 53/459; 53/374.4; 53/568
(58) Field of Classification Search ............... 53/370.4, 53/370.5, 371.3, 373.4, 373.5, 374.3, 374.4, 53/450, 375.4, 459, 558, 568
See application file for complete search history.

(56) References Cited

U.S. PATENT DOCUMENTS

| | | | | |
|---|---|---|---|---|
| 2,392,695 A | * | 1/1946 | Rohdin ...................... | 53/374.4 |
| 2,410,834 A | * | 11/1946 | Messmer .................... | 53/374.4 |
| 2,606,850 A | * | 8/1952 | Piazze ....................... | 53/370.5 |
| 2,987,106 A | * | 6/1961 | Messmer et al. ........... | 53/374.4 |
| 3,131,623 A | * | 5/1964 | Seefluth ..................... | 53/374.4 |
| 3,218,961 A | * | 11/1965 | Beason, Jr. et al. ......... | 53/374.4 |
| 3,552,088 A | * | 1/1971 | Niwa ......................... | 53/374.4 |
| 3,765,990 A | * | 10/1973 | Histed et al. ............... | 53/374.4 |
| 3,866,812 A | * | 2/1975 | Gutjahr .................... | 100/33 R |
| 3,914,917 A | * | 10/1975 | Young ....................... | 53/374.4 |
| 4,537,016 A | | 8/1985 | Shanklin et al. ............... | 53/493 |
| 4,561,529 A | * | 12/1985 | McIntosh .................. | 192/56.31 |
| 4,605,456 A | * | 8/1986 | Annis, Jr. ...................... | 100/32 |
| 4,984,416 A | * | 1/1991 | Duke ......................... | 53/373.5 |
| 5,987,856 A | * | 11/1999 | Lerner ......................... | 53/459 |
| 6,027,596 A | * | 2/2000 | DeFriese et al. ............. | 156/251 |
| 6,526,728 B1 | | 3/2003 | Sorenson et al. ............. | 53/450 |
| 6,807,795 B2 | * | 10/2004 | Stoddard et al. ............. | 53/417 |
| 6,854,245 B1 | * | 2/2005 | Stoddard et al. ............. | 53/417 |
| 7,073,308 B2 | * | 7/2006 | Dyke et al. ................ | 53/377.6 |
| 2006/0107621 A1 | * | 5/2006 | James et al. ............... | 53/374.3 |

OTHER PUBLICATIONS

Merriam-Webster's Collegiate Dictionary, tenth edition, 1999, p. 729, definition of the verb "mesh".*
International WIPO communication dated Jan. 17, 2008.

* cited by examiner

*Primary Examiner*—Louis K Huynh
(74) *Attorney, Agent, or Firm*—Nields, Lemack & Frame, LLC

(57) ABSTRACT

The present invention describes an improved grip belt drive system for use in sealing machines used to wrap articles in thermoplastic film. Briefly, a timing belt is used in place of the traditional flat or V belt. The presence of teeth on the pulleys, coupled with the use of a timing belt eliminates the possibility of slippage between the belt and the pulleys. To protect the system in the case of a film jam or misplaced article, a torque-limiting mechanism is included, which disengages the drive system if there is excessive counterforce. Furthermore, the outer surface of timing belt contains a pattern, which when mated with a second belt having the same or a complementary pattern, meshes in such a way so that the two belts are positively locked in both the longitudinal and transverse directions.

12 Claims, 8 Drawing Sheets

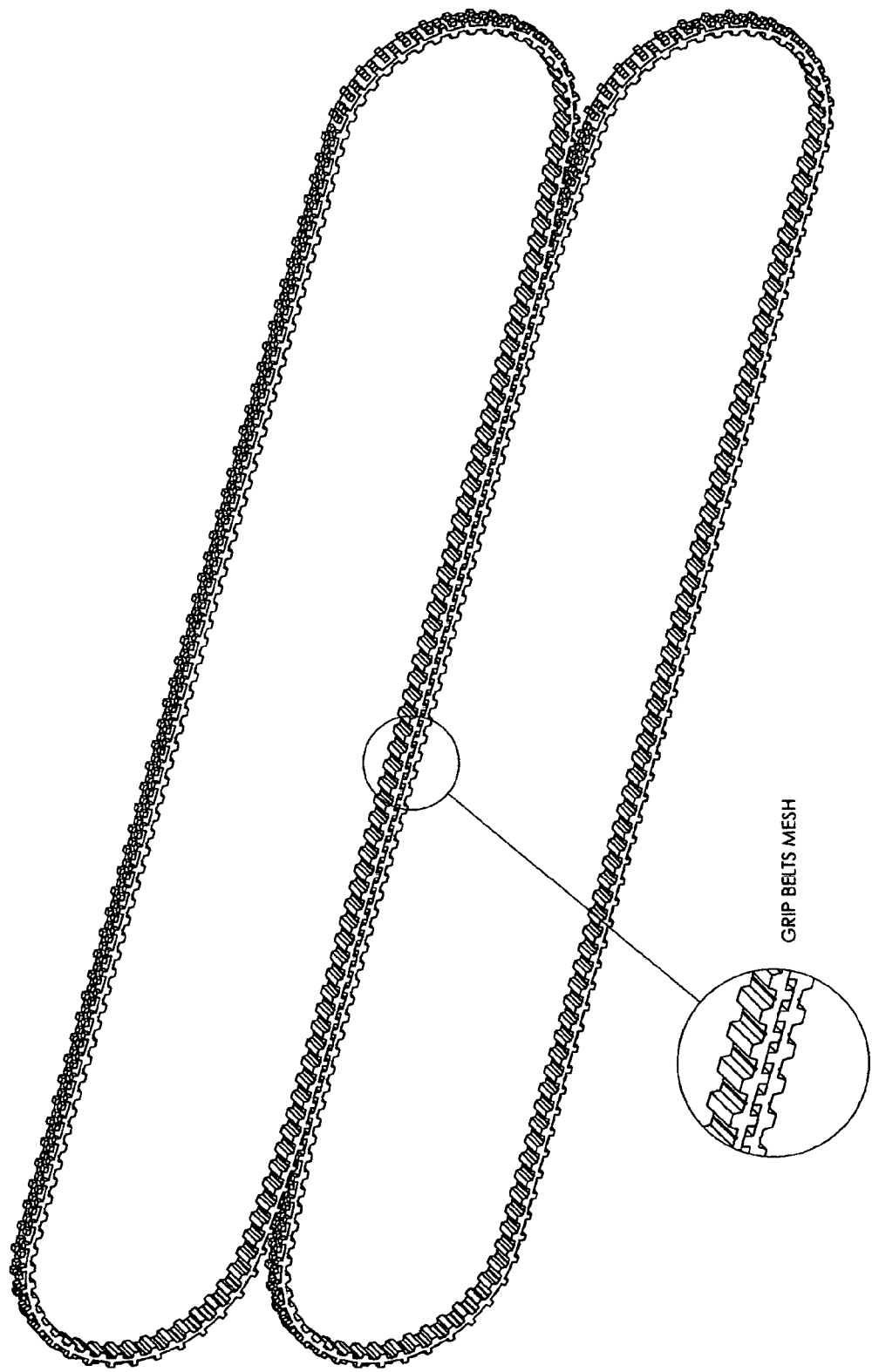

OTHER WAYS OF GRIPPING: HERRING BONE BELT

ROUND NUBS GRIP BELT

GRIP BELT DRIVE SYSTEM

BACKGROUND OF THE INVENTION

Machines used to wrap and seal articles and packages in thermoplastic film are well known in the art. Two types of machines are commonly referred to as side-sealing and lap-sealing machines. In the typical side-sealing configuration, an article or set of articles travels, typically via a conveyer belt, toward the machine. A sheet of center-folded plastic film, having two layers, is fed from a direction which is preferably perpendicular to the direction of the conveyer. The two layers of the film are then separated such that the article is placed between the lower layer and the upper layer. On one side of the article is the center-fold, while on the other side, there is an open edge where the two layers are not attached. The machine has a side sealing mechanism, which typically comprises several sets of belts to hold and guide the film, a heating/sealing element that fuses or welds the two free layers together and a cutting element that removes the excess material. Thus, as the article passes by the side sealing mechanism, this open edge is sealed by welding the two layers together, the plastic is cut and the waste is removed and discarded. At this point, the plastic film resembles a tube, with openings at both the leading and trailing ends of the article, but sealed along both sides. As the article continues to advance, an end sealing mechanism is then employed to seal the film at the leading end of the article. The article is further advanced and the end sealing mechanism then seals the film at the trailing end of the article.

Incomplete, inconsistent or sloppy welds can be problematic with these types of machines. One specific issue is caused by the height of the article. If the article to be encapsulated has significant height, the film becomes taut when wrapped around the article. This causes the film to exert forces attempting to pull the film toward the article at the time of side sealing. This can lead to incomplete welds. Attempted solutions to this problem include lowering the speed of the belt, or increasing the temperature of the heating/sealing element to attempt to form the weld before the film can be pulled away. However, neither solution has been satisfactory in rectifying the problem.

U.S. Pat. No. 6,526,728 describes a side-sealing machine, including two sets of cooperating pulleys, where each set includes a drive pulley, a tail pulley and a number of idler pulleys. It further discloses that there are two belts associated with each set of pulleys. The outer set of belts travels roughly in the same direction as the flow of plastic, while the inner set diverges so as to keep the waste material separate from the film after cutting. To keep the film from slipping, longitudinal V-ribbed belts are used, with the upper and lower belts offset so that the peak of the V shape in the upper belt fits into the valley of the V shape in the lower belt, and vice versa. As previously stated, this V pattern exists only in the longitudinal direction. This meshing action is designed to prevent slippage of the film, specifically in the transverse direction.

While this meshing action improves welds, inconsistent seals are still problematic. As stated above, the design of the interlocking belts eliminates any slippage in the direction traverse to the direction of film travel. However, it still allows slippage in the direction of travel. This can cause the film to slip and gather near the cutting element, creating sloppy or incomplete welds.

The belts commonly used in side-sealing machines are typically smooth along the edge which interacts with the pulley system. Thus, even with belts in which the V pattern is transverse to the direction of travel, it is also possible for the belts to slip with respect to the pulleys, also causing inferior welds.

SUMMARY OF THE INVENTION

The problems associated with the prior art have been overcome by the present invention, which describes an improved grip belt drive system for use in sealing machines. Briefly, a timing belt is used in place of the traditional flat or V belt. The presence of teeth on the pulleys, coupled with the use of a timing belt eliminates the possibility of slippage between the belt and the pulleys. To protect the system in the case of a film jam or misplaced article, a torque-limiting mechanism may be included, which disengages the drive system if there is excessive counterforce. Furthermore, the outer surface of the timing belt contains a pattern, which when mated with a second belt having the same or a complementary pattern, meshes in such a way that the two belts are positively locked in both the longitudinal and transverse directions.

BRIEF DESCRIPTION OF THE DRAWINGS

FIG. 5 illustrates the meshing of two timing belts in accordance with the present invention;

DETAILED DESCRIPTION OF THE INVENTION

Figure 1:
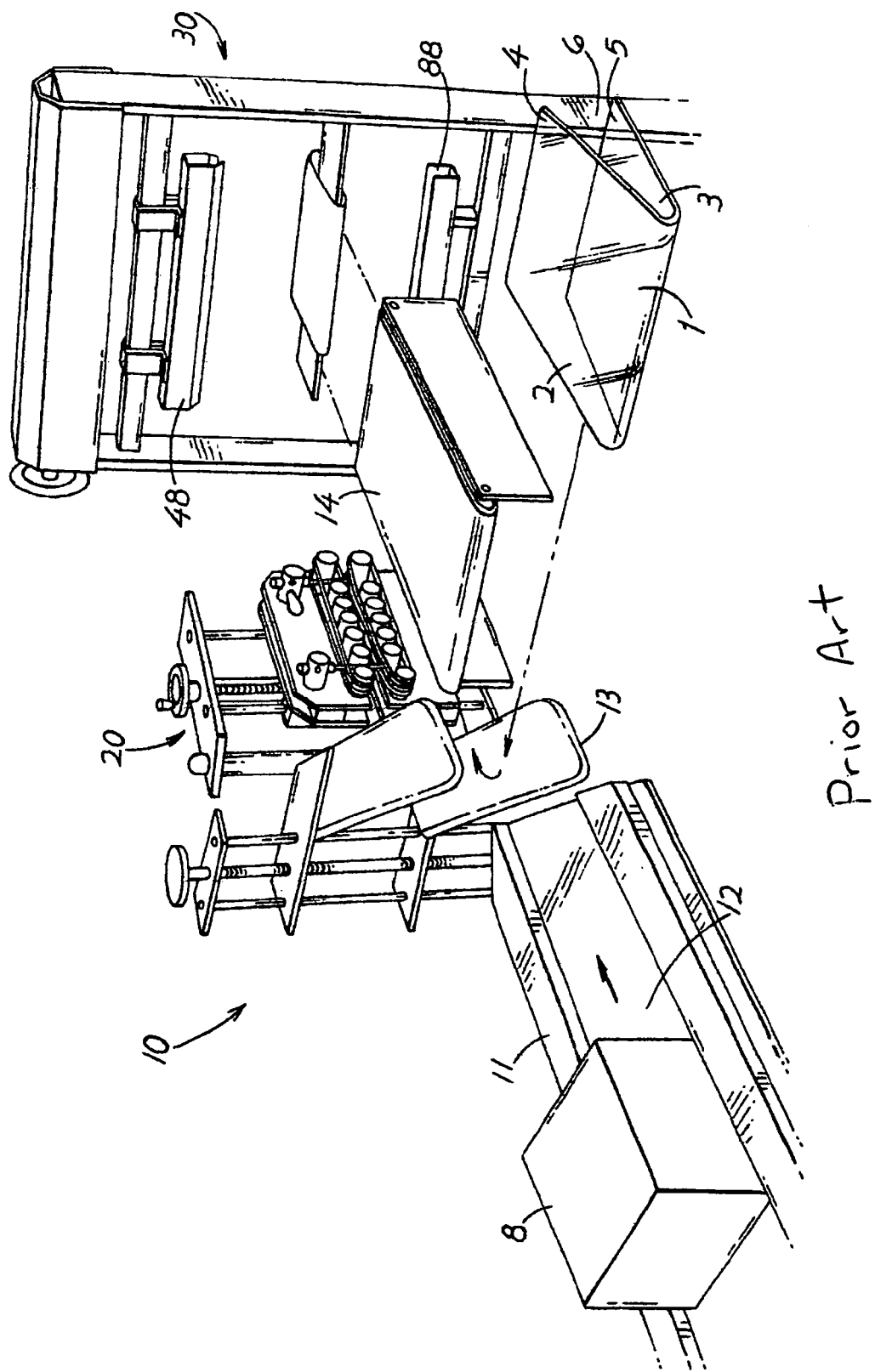
FIG. 1 illustrates a representative side-sealing machine of the prior art.

FIG. 1 illustrates a representative side-sealing machine used to encapsulate or wrap an article in thermoplastic film, as described in U.S. Pat. No. 6,526,728. The machine 10 utilizes a conveyer belt 12 operating at a relatively constant speed to deliver articles 8 that are to be encapsulated. The thermoplastic film 1 is center-folded, such that the side with the fold is closed, while the opposite side 6 is open. On this opposite side, there are two layers of film 4,5, which will later be sealed. This center-folded thermoplastic film 1 is fed from a reel (not shown) that is preferably mounted perpendicular to the direction of travel of the conveyer belt 12. The film is then inverted and separated by an inverter 13 such that the article is enveloped between the two layers 4,5. At this point, the film 1 on one side of the article is closed, while the opposite side 6 remains open. Also, the film at both the leading and trailing ends of the article is not sealed. Downstream from the inverter is the side-sealing mechanism 20. After proper relative positioning of the article between the layers of the film 4,5, the enveloped article approaches the side-sealing mechanism 20.

The side-sealing mechanism 20 is located on the open side 6 of the enveloped article. The mechanism holds the two layers of film 4,5 together, and guides the layers through the sealing and cutting elements. It then welds the two layers together, and cuts off the surplus material. The surplus material is pulled away so as not to reattach to the film while it is still at an elevated temperature.

Figure 2:
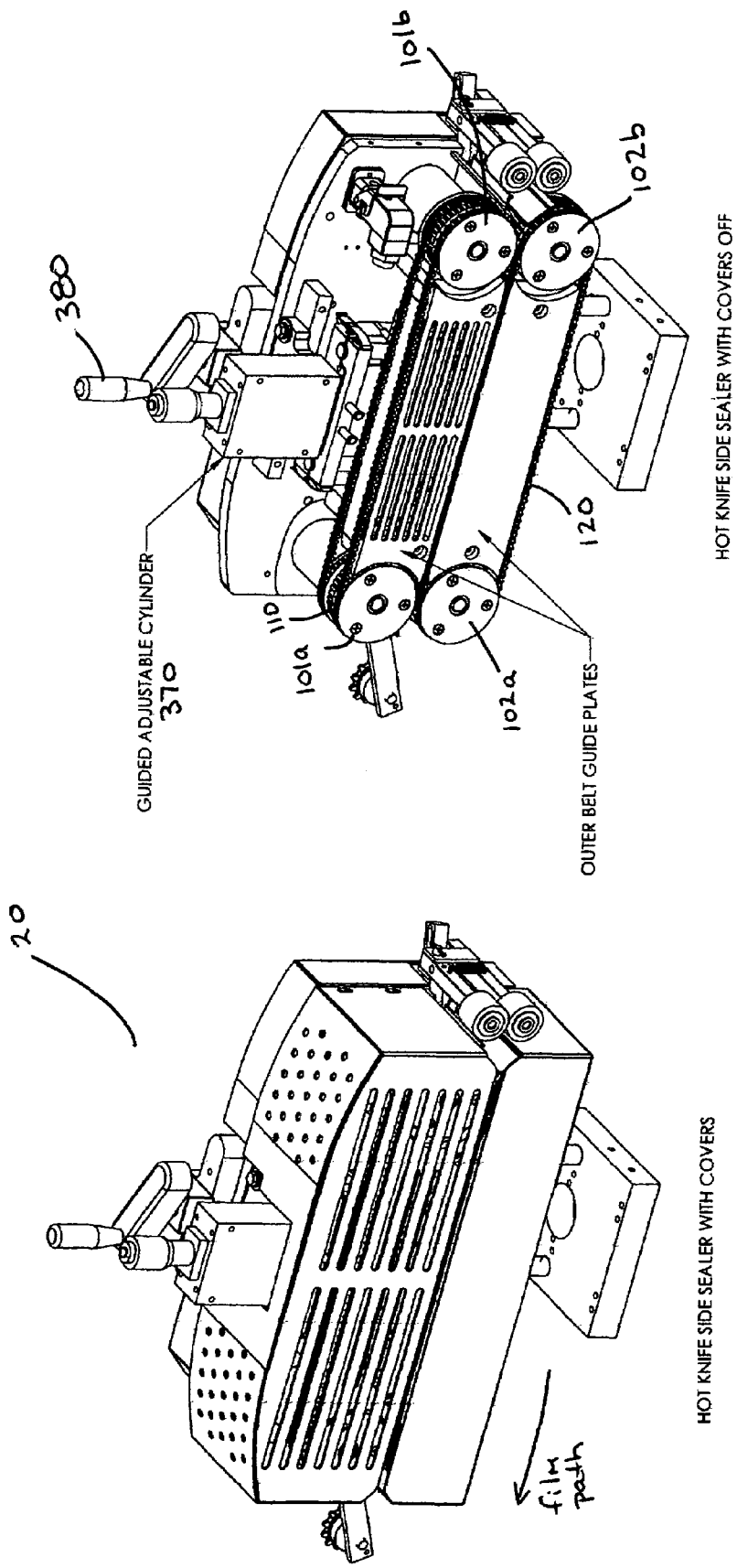
FIG. 2 illustrates a side-sealing mechanism in accordance with the present invention.

As shown in FIG. 2, to perform these actions, the mechanism 20 preferably comprises two sets of cooperating pulleys, an upper set 101 and a lower set 102. These sets work in unison to pull the two layers of film into the mechanism and hold the layers in place. In the preferred embodiment, each of the pulleys has teeth 110 in its channel so as to accept one or more, preferably two, timing belts 120. The presence of teeth 110 ensures that the timing belt does not slip relative to the pulleys; a common problem with the prior art. The first set of pulleys 101 is located above the layers of film, while the second set 102 is located below the layers. Each set comprises a drive pulley 101a, 102a and a tail pulley 101b, 102b. There may optionally be one or more idler pulleys (not shown). Each of these pulleys also has one or more, preferably two, O-rings mounted in the channel where the belts are located, so as to provide individual channels for each of the timing belts.

Each of the timing belts has a special gripping outer surface, that is bonded to a truly endless steel or Kevlar reinforced timing belt. Each corresponding set of belts has upper and lower pressure plates that are preset to insure good contact between the meshing pair of belts.

Figure 3:
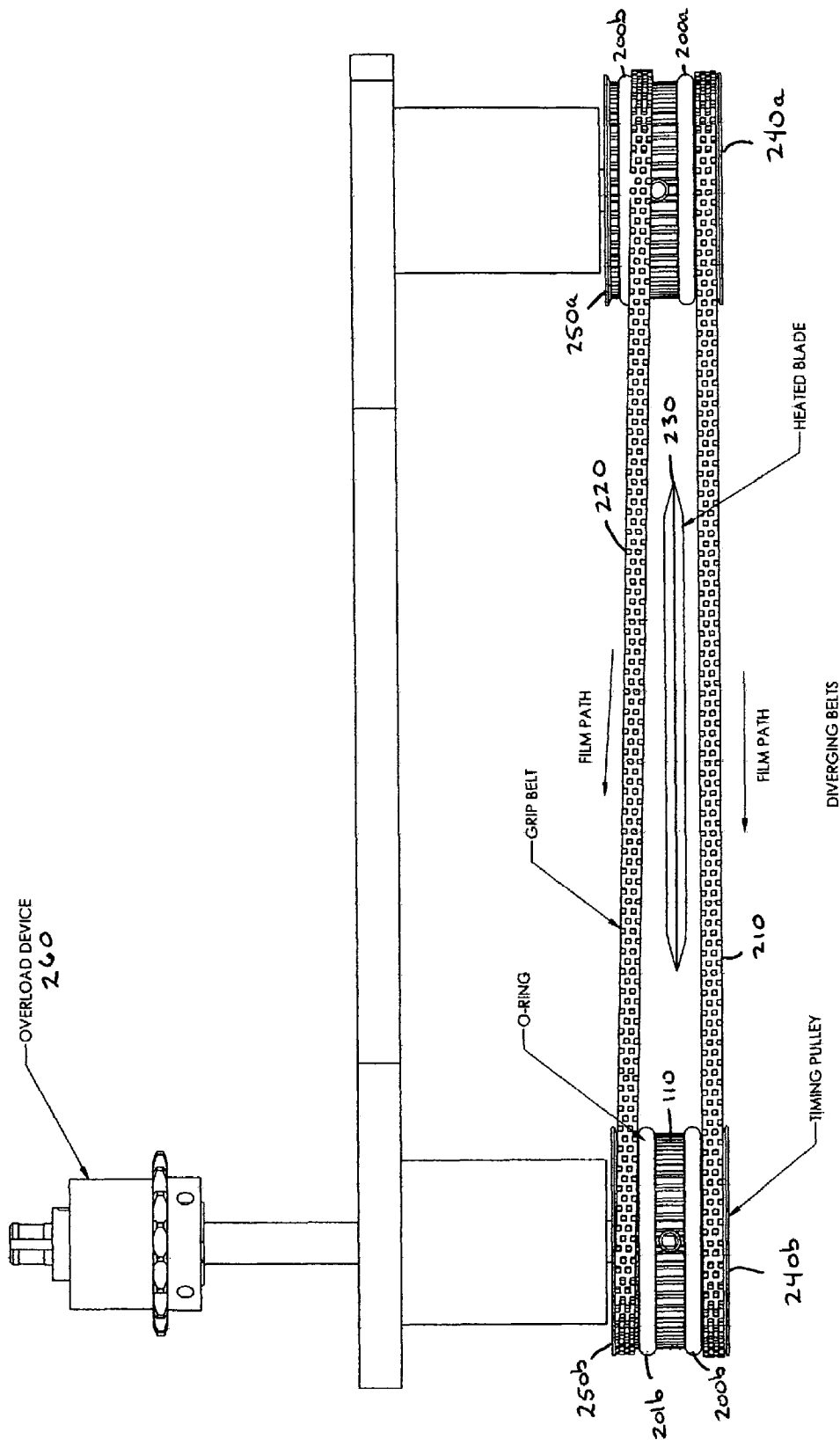
FIG. 3 illustrates a top view of the side-sealing mechanism shown in FIG. 2.

As shown in FIG. 3, one set of O-rings 200 is positioned such that the movement of the outermost belt 210 is made to be parallel to the direction of the film movement. The outer wall of the pulleys 240 and this first set of O-rings 200 provide the guides for the outermost belt 210. As shown in FIG. 3, O-ring 200a and O-ring 200b are equidistant from the outer wall of their respective pulleys. A second set of O-rings 201 is used to guide the innermost belt 220 in a path that diverges away from the direction of the film and the outermost belt 210. This can be accomplished in a number of ways. For example, a combination of one O-ring 201b and the inner wall of the downstream pulley 250b can be used to define the channel for the innermost belt 220, as shown in FIG. 3. Similarly, 2 O-rings may be inserted on the upstream pulley to define a channel for the innermost belt. Alternatively, a single O-ring 201a, as shown in FIG. 3, can be used to define the inner wall of the channel for the innermost belt 220. Because of the divergence angle, there are no forces pushing the innermost belt 220 toward the outermost belt 210, thus the second O-ring may be eliminated. In other words, in the channel associated with the upstream pulley 240a, the O-ring 201a provides the inner guide for the belt 220. In the channel associated with the downstream pulley 240b, the O-ring 201b provides the outer guide for the belt 220. As a result, the innermost belt 220 is closest to the outermost belt 210 at the upstream pulley, and farthest away from it at the downstream pulley. The cutting element 230 is preferably located between the upstream and downstream pulleys. Thus, as the film passes the upstream pulley, it is still intact; however, it is cut before it reaches the downstream pulley. By introducing this divergence angle, the innermost belt 220 helps guide the unwanted surplus away from the film after it is cut. In the preferred embodiment, the innermost belt 220 is guided in the channel of the downstream pulley a distance further away from the film than on the upstream pulley sufficient to force the surplus plastic away from the film. One such suitable distance is about ¼ inch. This ensures that the surplus material does not reattach itself to the film while still at an elevated temperature. This surplus material is then held under tension and fed into a reel, which is later discarded.

Figure 4:
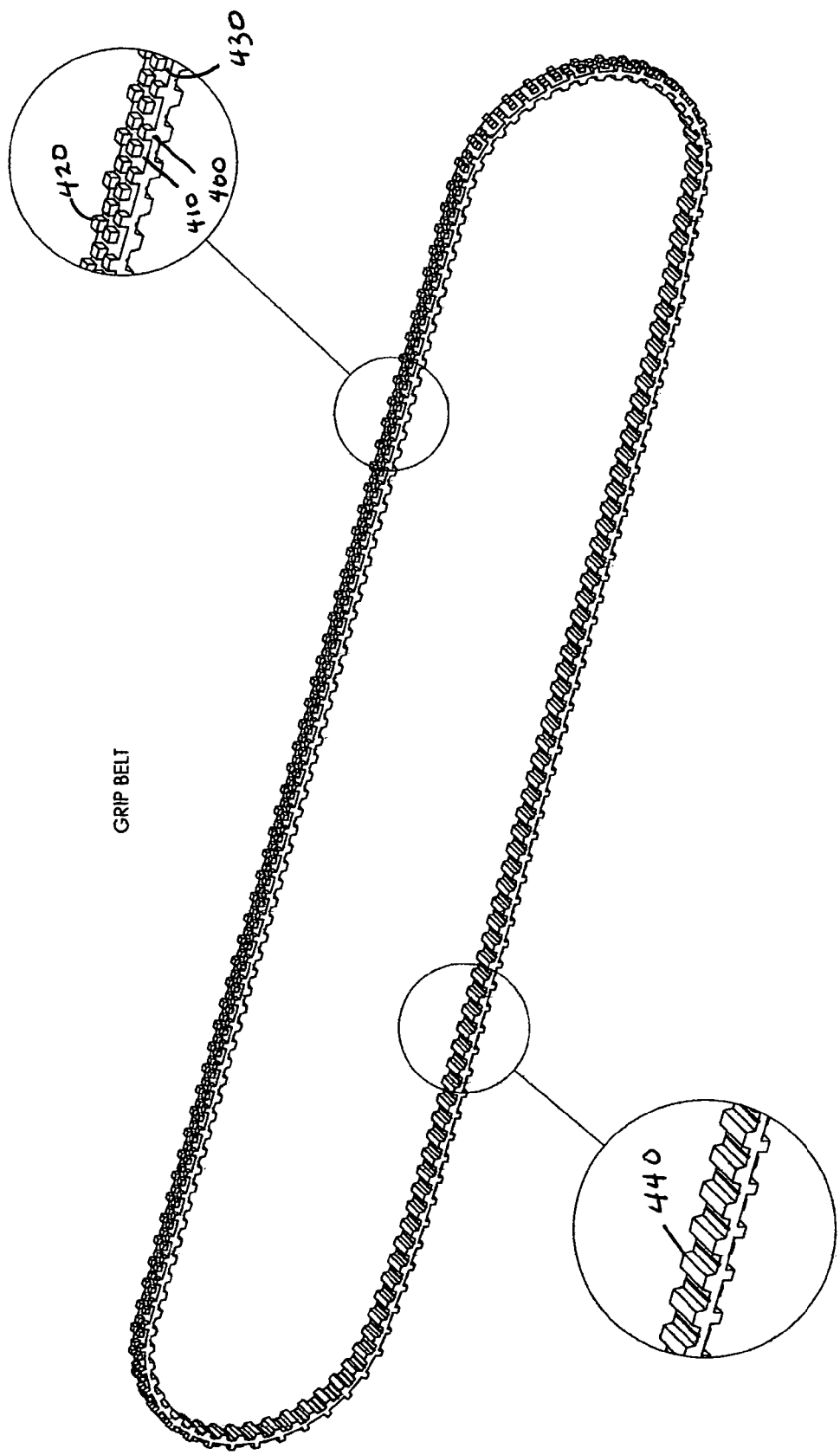
FIG. 4 illustrates the timing belt in accordance with the present invention.

On the outer surface of each timing belt is a three dimensional pattern, such as the one shown in FIG. 4. In the preferred embodiment, this pattern comprises a series of regularly shaped protrusions, such as squares, hexagons, or the like. In the first row 400, there are two such protrusions 420, spaced apart by a distance roughly equal to the width of a protrusion. As shown in the insert of FIG. 4, the surface of the first row 400, looking from left to right, contains a protrusion 420, followed by a depression 430, followed by a protrusion 420, followed by a second depression 430. A second adjacent row 410 has this same series of protrusions and depressions; however, this series is offset from the first row by the width of a protrusion. Thus, the second row contains a protrusion where a depression exists in the first row; and contains a depression where the first row contains a protrusion. This gives a "checkerboard" type pattern of protrusions. This set of two rows is then repeated over the entire outer surface of the timing belt. Preferably, the dimensions of the protrusions and the spacing between rows are such that there is an even number of rows over the circumference. This guarantees that the pattern is not discontinuous at any point. While this is preferred, the present invention also contemplates the situation where there is not an even number of rows. In that scenario, there is a single discontinuity on each belt. The effect of this single small discontinuity over a significantly longer circumference is trivial in terms of the ability of the timing belts to hold the film in position without slippage. On the side opposite this pattern, or the inner circumference of the timing belt, there is a series of grooves 440, adapted to mesh with the teeth 110 in the channel of the pulleys.

Each of the upper timing belts is pressed against a corresponding lower timing belt via upper and lower pressure plates. The lower and upper drive pulleys are kept in synchronization via a synchronization gear. As shown in FIGS. 4 and 5, the upper and lower belts are pressed together such that the first row on the upper belt meshes with the second row on the lower belt. Likewise, the second row on the upper belt meshes with the first row on the lower belt. This meshing of the two belts ensures that the belts are interlocked, thereby ensuring that there is no slippage in either the longitudinal or transverse directions. Thus, even in the presence of forces attempting to pull the film away from the pulleys, the outer surfaces of the timing belts will prevent slippage in both directions.

Figure 6A:
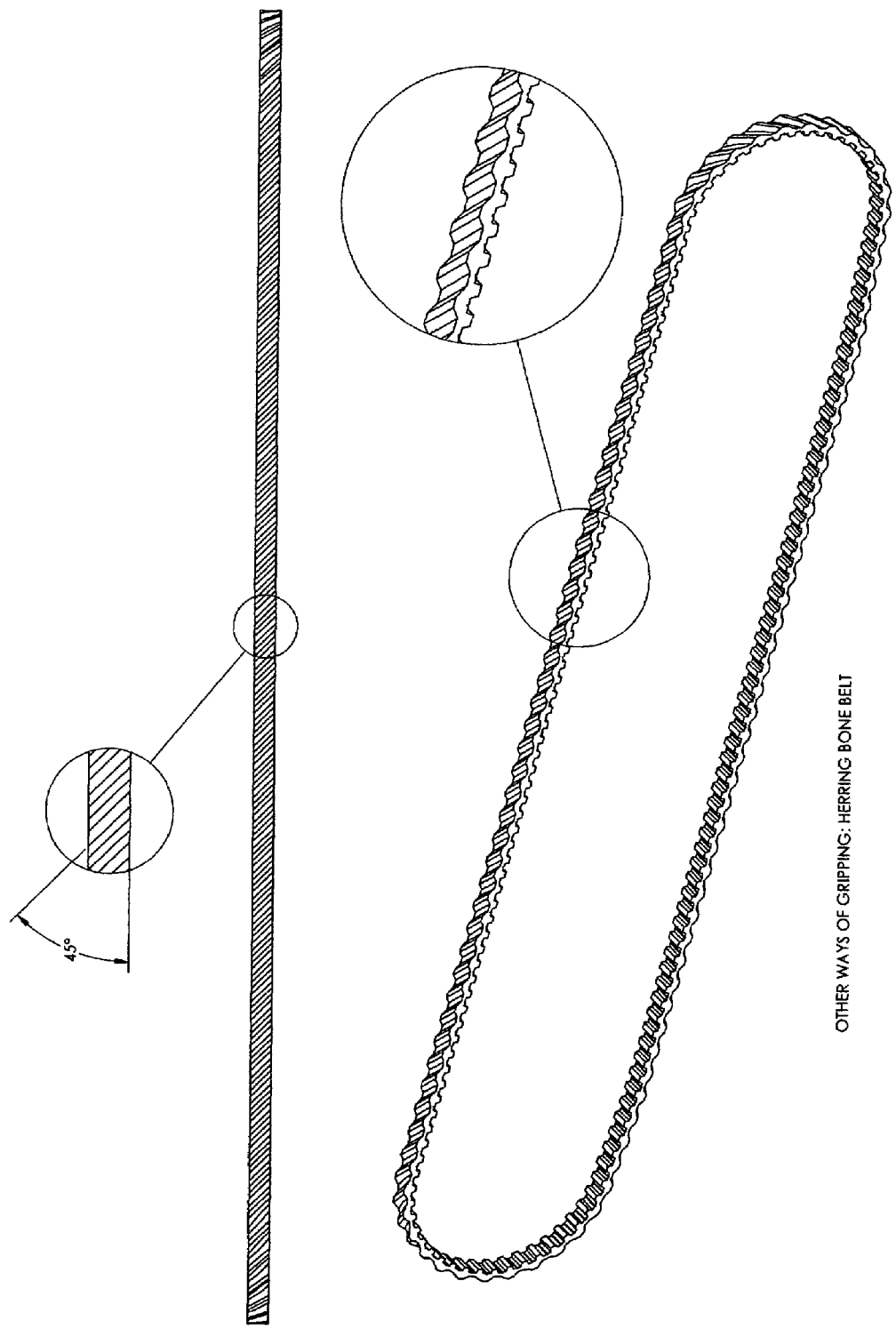
FIG. 6a illustrates a second embodiment of the timing belt in accordance with the present invention.
Figure 6B:
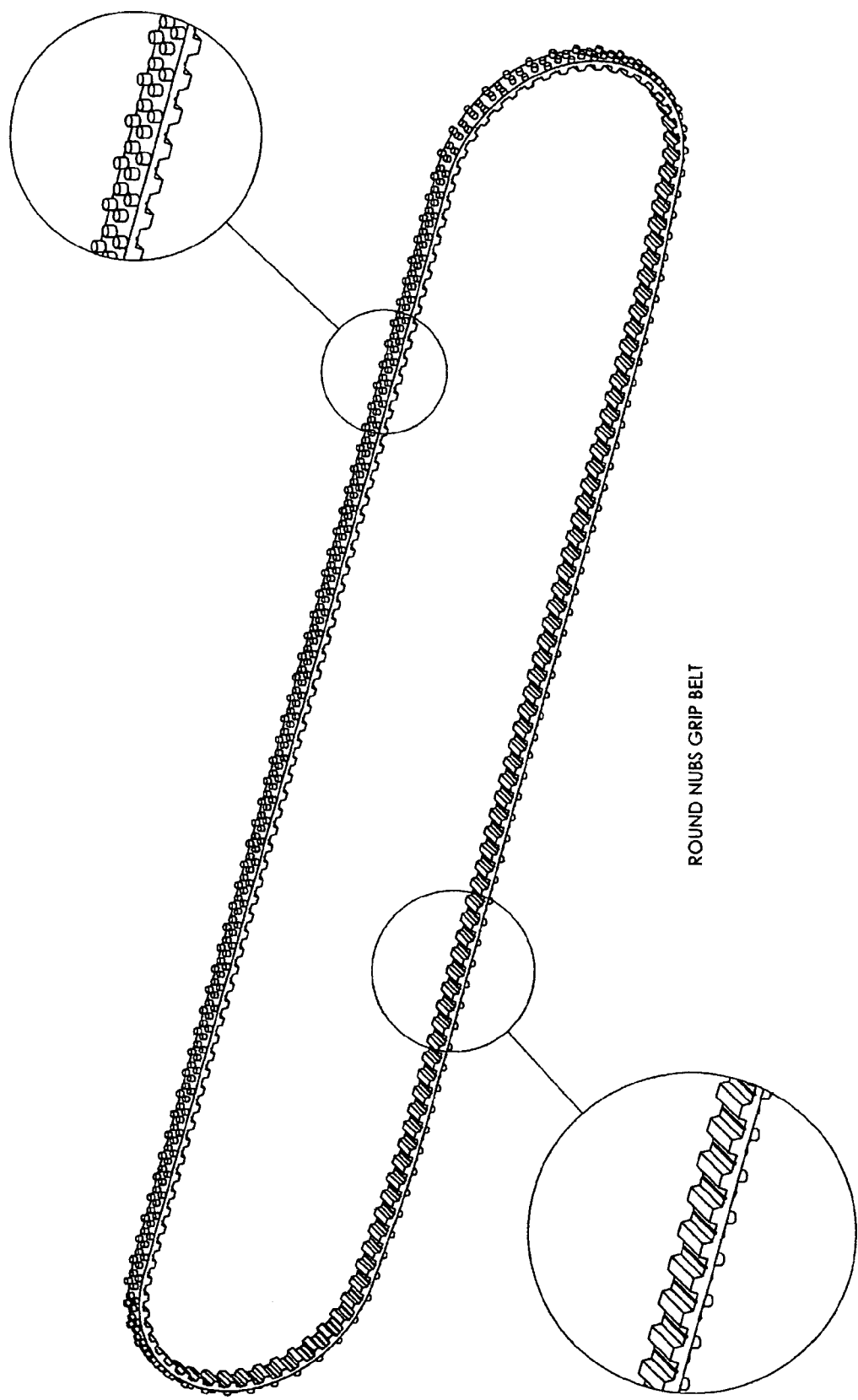
FIG. 6b illustrates a third embodiment of the timing belt in accordance with the present invention.
Figure 6C:
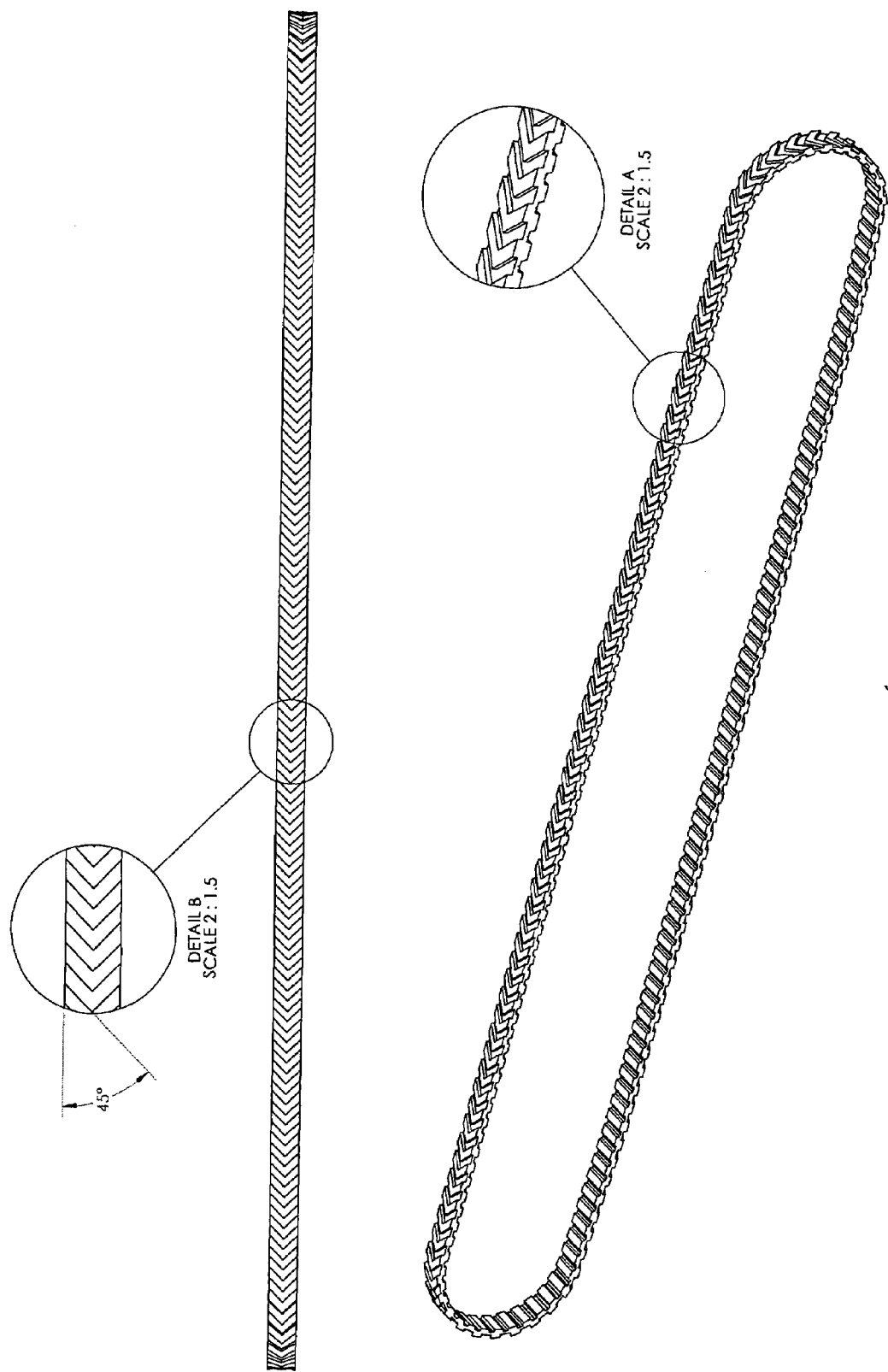
FIG. 6c illustrates a fourth embodiment of the timing belt in accordance with the present invention

While the pattern shown in FIG. 4 is preferred, it is not the only such pattern that prevents slippage in both the longitudinal and transverse directions. For example, a pattern containing alternating protrusions and depressions formed so as to resemble the letter "V" would have the same longitudinal and transverse locking ability, as shown in FIG. 6c. Similarly, other interlocking patterns, such as "W" shaped, also insure a positive lock in both directions. Also, a pattern in the form of a set of slanted protrusions in the form of a slash ("/"), as shown in FIG. 6a, also serves to prevent slippage in the longitudinal and transverse directions. Similarly, the protrusions can also be circular in shape, as shown in FIG. 6b.

The above-described patterns illustrate the scenario where both the upper and lower belts utilize the same pattern, and these patterns are slightly offset on the opposing pulleys to allow the timing belts to interlock. Alternatively, two different patterns can be utilized. For example, one of the belts can contain a pattern of protrusions that resembles the letter "X". In this case, the opposing belt would contain a pattern of protruding diamonds that would mesh with the "X" characters of the first belt. Other complementary sets of patterns for the opposing belts are also possible and within the scope of the invention.

As described above, the use of timing belts insures that there is no slippage between the pulley and the belt, which can happen in machines of the prior art. However, the slippage inherent in the prior art was useful in the event of a film malfunction or stoppage. Previously, if the film were unable to be advanced, the belt would slip relative to the pulley and hence prevent any damage to the system. With the use of timing belts, this slippage is no longer possible. Thus, to provide the necessary safeguards, a torque-limiting device 260 is employed, as shown in FIG. 3. In the preferred embodiment, this torque limiting is provided by means of a clutch, which disengages the drive pulley if the counterforce exerted exceeds a predetermined threshold.

Returning to FIG. 1, after the article passes the side-sealing mechanism 20, it encounters a second heating/sealing element 48. This element 48 is used to seal and cut the leading and trailing edges of the film surrounding the article. When the article 8 is properly positioned, the second heating/sealing element 48 descends so as to contact the thermoplastic film. This serves to weld the layers together. The film is then cut, preferably in the middle of the newly created seal. The article 8 is then advanced so as to position the trailing edge of the article under the second heating/sealing element 48. This process is then repeated, thereby completely sealing the article in thermoplastic film.

What is claimed:

1. A method for encapsulating an article in a heat sealable film comprising the steps of:
   providing a center folded film having two layers and an opening along one side;
   placing an article between said two layers;
   providing a first set of pulleys, positioned on said open side of said film, wherein each of said pulleys comprise a channel adapted to contain at least one belt;
   providing a first belt located in said channels of said first set of pulleys, said first belt comprising an inner surface adapted to contact said channel in said first set of pulleys, and a first pattern of protrusions and depressions on its outer surface, said first belt adapted to contact one side of said film;
   providing a second set of pulleys, positioned on the opposite side of said film, wherein each of said pulleys comprise a channel adapted to contain at least one belt;
   providing a second belt located in said channels of said second set of pulleys, said belt comprising an inner surface adapted to contact said channel in said second set of pulleys, and a second pattern of protrusions and depressions on its outer surface, said second belt adapted to contact the opposite side of said film, and
   grasping said film between said first and said second belts, whereby said first pattern and said second pattern are formed such that the protrusions in said first belt are aligned with said depressions in said second belt and said depressions in said first belt are aligned with protrusions in said second belt, such that said belts mesh in the longitudinal and in the transverse directions; wherein the meshing of said belts positively locks said belts in the longitudinal and transverse directions.

2. The method of claim 1, further comprises the steps of:
   providing sealing and cutting elements to weld and cut said film while being grasped by said belts;
   welding and cutting said film with said sealing and cutting elements, thereby sealing said open side and forming a waste portion;
   providing a third belt on said first set of pulleys and a fourth belt on said second set of pulleys, whereby the path of said third and fourth belts diverges away from said film; and
   diverging said waste portion away from said film.

3. A machine adapted to encapsulate an article in a heat sealable film comprising:
   a first set of pulleys, positioned on one side of said film, wherein each of said pulleys comprises a channel adapted to contain at least one belt;
   a first belt, having an outer surface adapted to contact one side of said film, located in said channels of said first set of pulleys, said first belt comprising an inner surface adapted to contact said channel in said first set of pulleys, and a first pattern of protrusions and depressions on said outer surface;
   a second set of pulleys, positioned on the opposite side of said film, wherein each of said pulleys comprises a channel adapted to contain at least one belt;
   a second belt, having an outer surface adapted to contact the opposite side of said film, located in said channels of said second set of pulleys, said second belt comprising an inner surface adapted to contact said channel in said second set of pulleys, and a second pattern of protrusions and depressions on said outer surface, wherein said first pattern and said second pattern are formed such that said protrusions in said first belt are aligned with said depressions in said second belt and said depressions in said first belt are aligned with said protrusions in said second belt, such that said belts mesh in the longitudinal and in the transverse directions; wherein the meshing of said belts positively locks said belts in the longitudinal and transverse directions.

4. The machine of claim 3, wherein said first pattern comprises a repeating set of two rows, wherein the first row comprises an alternating pattern of roughly equally dimensioned protrusions and depressions and the second row comprises said alternating pattern, offset by the dimension of one protrusion.

5. The machine of claim 3, wherein said first pattern comprises a repeating set of protrusions and depressions, wherein each of said protrusions and depressions resembles the letter "V" when viewed from above said belt.

6. The machine of claim 3 wherein said first and said second patterns are the same.

7. The machine of claim 3, wherein said first and said second belts comprise teeth on said inner surface.

8. The machine of claim 7, further comprising a torque limiting device operatively connected to at least one of said pulleys.

9. The machine of claim 8, wherein said torque limiting device comprises a clutch.

10. The machine of claim 3, further comprising a third belt located in said channel of said first set of pulleys and a fourth belt located in said channel of said second set of pulleys.

11. The machine of claim 10, wherein the path of said first and second belts is parallel to the movement of said film, and the path of said third and fourth belts diverges away from said movement of said film.

12. The machine of claim 3, wherein said channels of said first and second set of pulleys comprise teeth.

* * * * *